3,217,826
HYDRAULIC WHEEL SLIP CONTROL
John W. Carter and Gordon W. Johnson, Peoria, and Robert N. Stedman, Chillicothe, Ill., assignors to Caterpillar Tractor Co., Peoria, Ill., a corporation of California
Continuation of application Ser. No. 280,793, May 16, 1963. This application Dec. 17, 1964, Ser. No. 419,630
8 Claims. (Cl. 180—77)

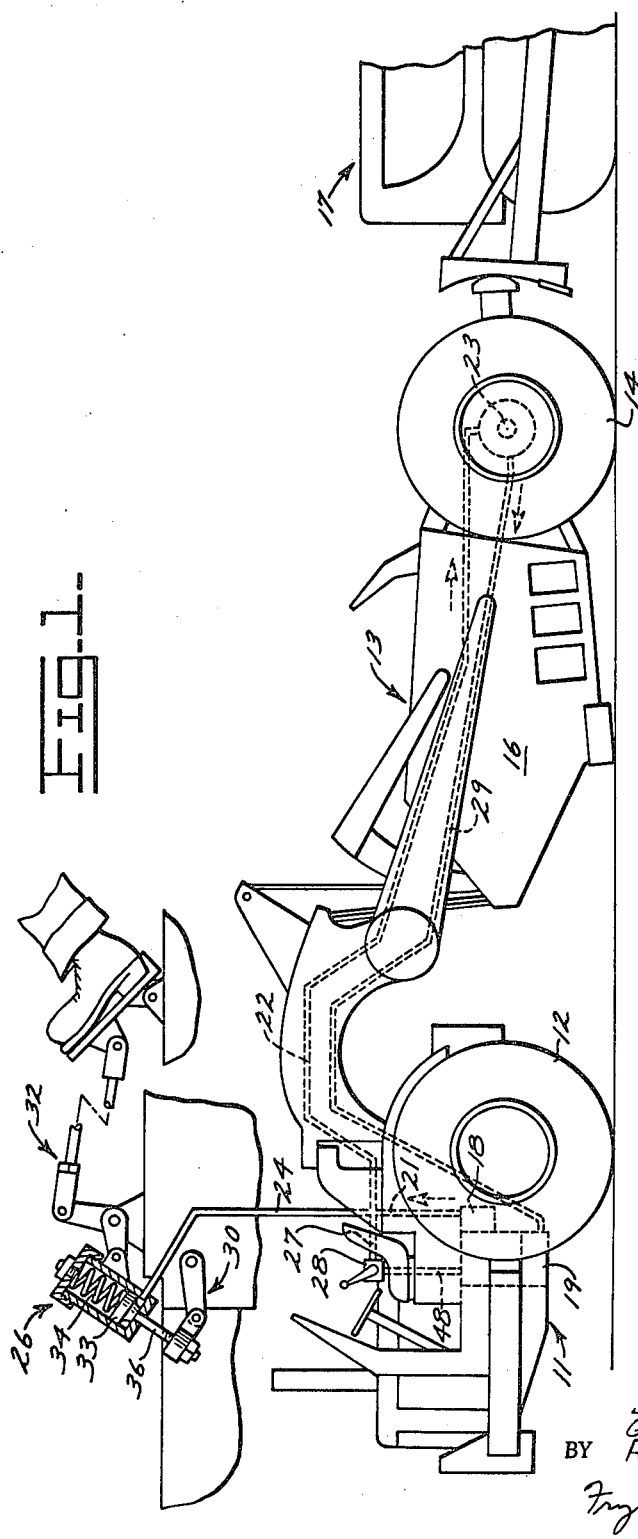

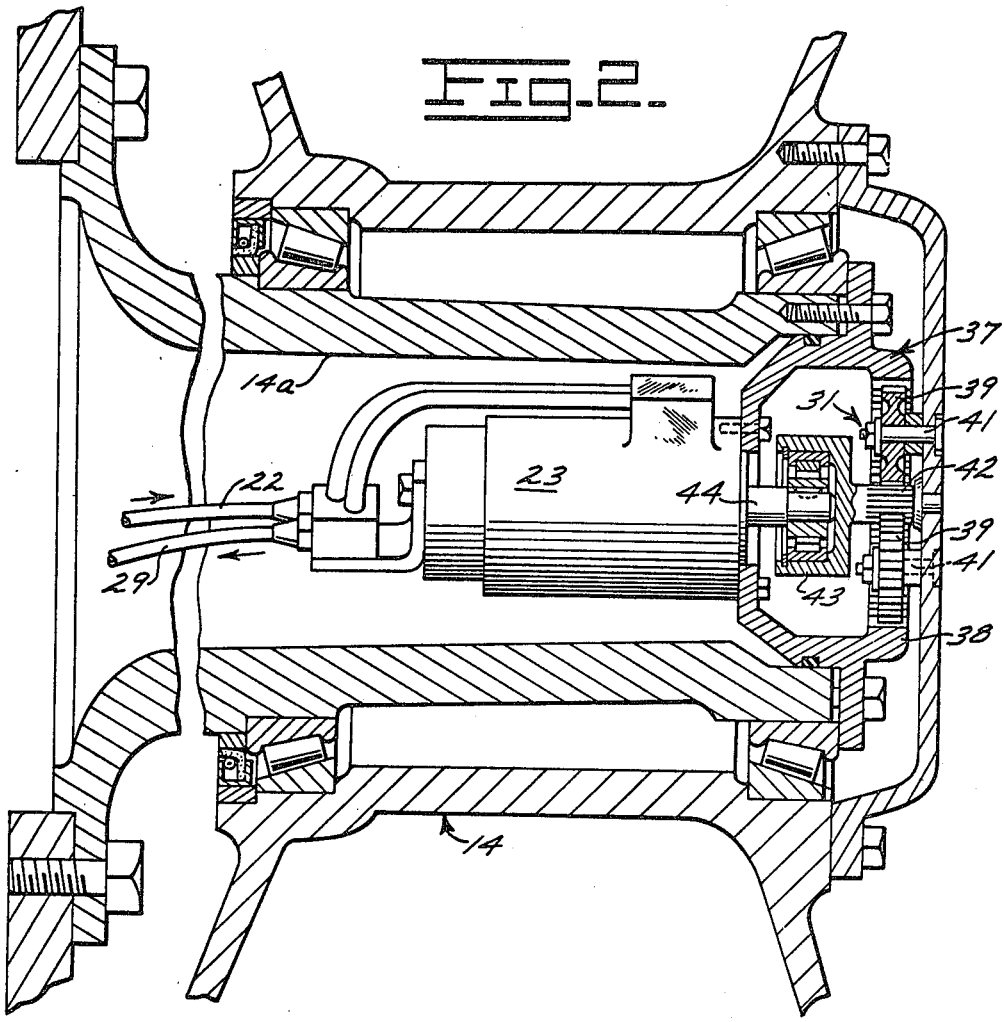

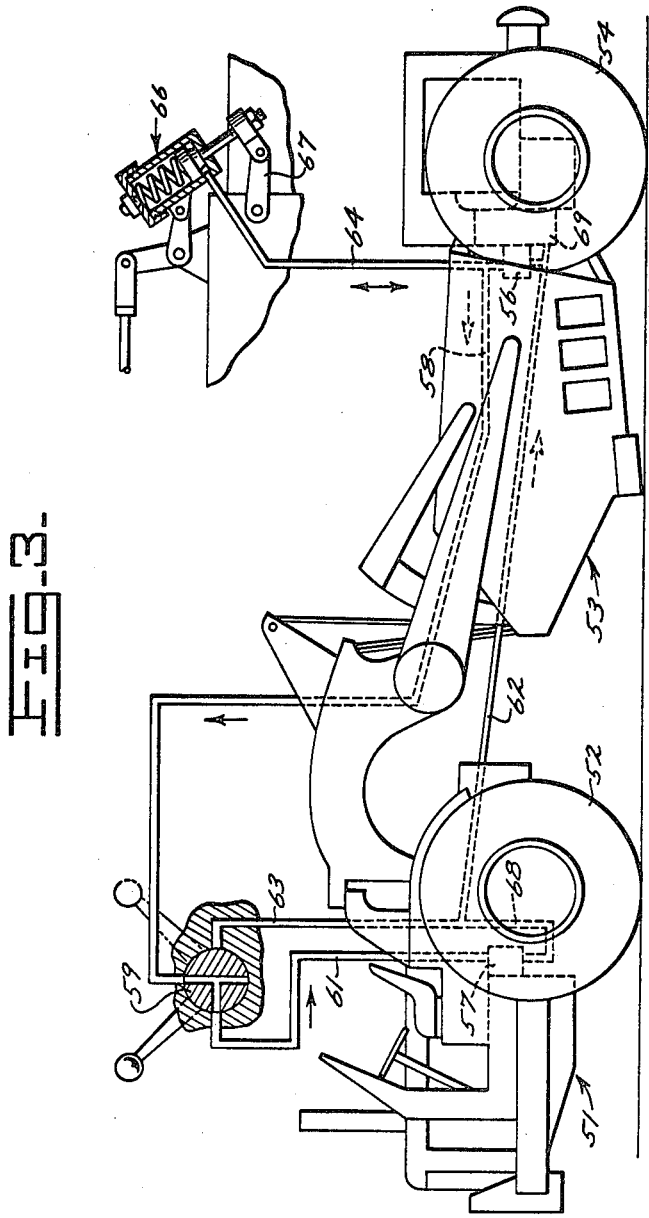

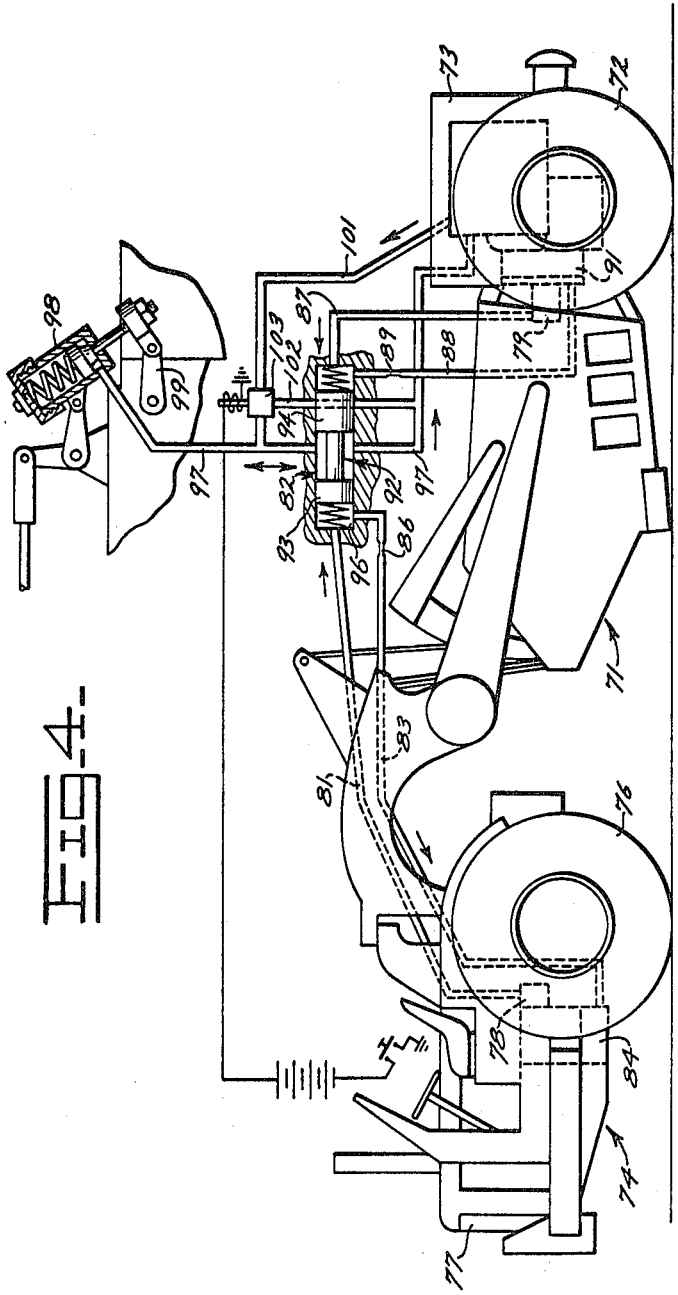

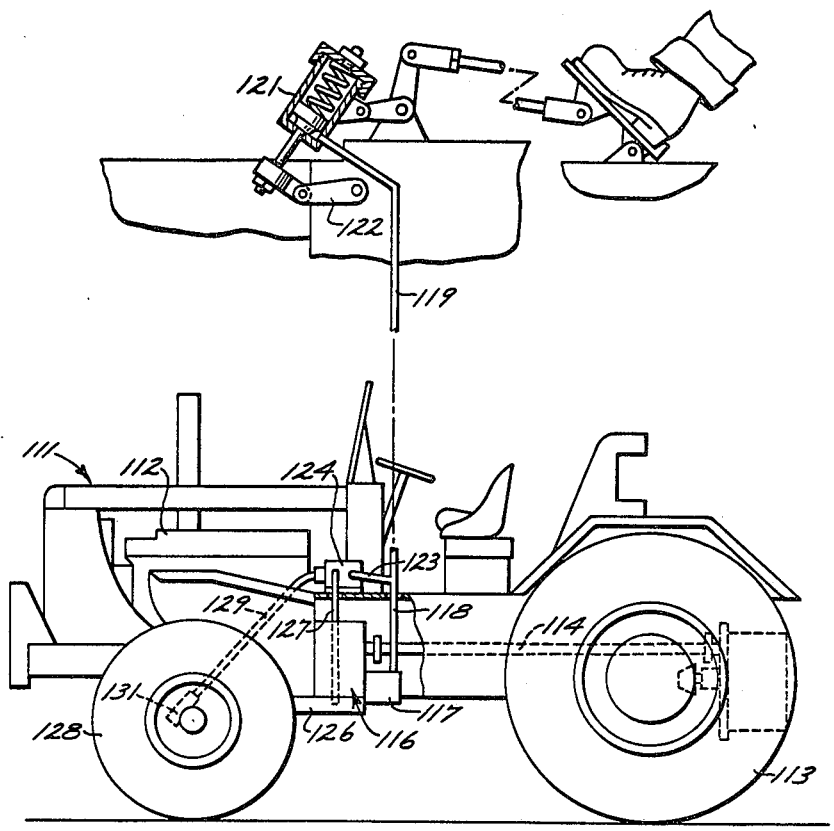

The present invention relates to means for controlling the relative speed between the driven wheels and non-driven wheels of a vehicle.

This application is a continuation of application Serial No. 280,793, filed May 16, 1963, and now abandoned.

The present invention is particularly applicable for use with vehicles of the earth moving variety wherein slipping of the driven wheels is not an uncommon occurrence. Modern-day earth moving vehicles are becoming larger and more powerful to increase efficiency and thereby reduce construction costs. These large vehicles require the use of very large tires which represent a substantial portion of the machine's initial cost and operating overhead. Thus, wheel slippage with accompanying excessive tire wear is so economically hazardous that crawler type tractors are often employed in pushing arrangement with the wheeled vehicle as the sole source of motivating power. Since this is not the most efficient manner of operating earth moving vehicles, a dependable means for eliminating wheel slippage is considered of the utmost importance and desirability.

Accordingly, it is an object of the present invention to provide means for detecting and controlling the slippage of the power driven wheels of a wheeled vehicle.

It is another object of the present invention to provide hydraulic means for sensing and controlling the slippage of driven wheels of an earth moving vehicle.

It is a further object of the present invention to provide hydraulic means for detecting and controlling the slippage of the tractor wheels of a tractor driven scraper, of the wheels of a scraper having its own power source driving the scraper wheels, and of the driven wheels of a four wheel tractor.

Further and more specific objects and advantages of the present invention will be made apparent in the following specification wherein a preferred form of the invention is described by reference to the accompanying drawings.

In the drawings:

FIG. 1 is a generally schematic illustration of a tractor drawn scraper with the hydraulic wheel slip control device of the present invention shown in controlling arrangement with the engine speed regulation means;

FIG. 2 is a partial cross sectional illustration of hydraulic motor means and the non-driven wheels of the scraper of FIG. 1;

FIGS. 3 and 4 illustrate alternate embodiments of the present invention as employed to prevent the slippage of the power driven wheels of a scraper; and FIG. 5 illustrates an embodiment of the invention as employed on a four wheel tractor.

Referring now to FIG. 1, a tractor 11 having a pair of power driven wheels 12 (only one of which is shown) is attached to and provides the primary motive force for a scraper 13. Scraper 13 has a pair of non-power driven wheels 14 (only one of which is shown) which always travel at the ground speed of the vehicle and thus provide a measure thereof.

During loading operations in which earth is gathered by the scraper bowl 16, it is not uncommon for the power driven wheels 12 to break loose from the terrain over which they are traveling and thus be driven at a speed greater than that at which the vehicle is moving (as indicated by the speed at which wheels 14 are moving). As mentioned above, this wheel slippage problem is of such concern that it is not uncommon for the tractor 11 to be completely neutralized during scraper loading operations and a crawler tractor, a portion of which is shown at 17, to be employed as the source of motivating power by pushing the scraper from the rear.

The present invention provides means for inhibiting the slipping of wheels 12 by providing a control which decreases the speed of the engine of the tractor 11 when the speed of the tires 12 exceeds the ground speed by a preset amount. More particularly, a hydraulic pump 18 is driven by the tractor transmission so as to be operated at a speed which is proportional to the speed of wheels 12. Pump 18 draws hydraulic fluid from a sump 19 and delivers it via conduits 21 and 22 to a fluid motor 23 associated with the wheels 14 of scraper 13. A conduit 24 leading to a hydraulically actuated servo 26 and a conduit 27 leading to a manually operable valve 28 communicate with one another as well as with conduits 21 and 22.

During operation of the tractor drawn scraper in which wheels 12 and 14 are both operating at ground speed (wheels 12 not slipping) pump 18 will deliver hydraulic fluid through conduit 22 to motor 23 which will be operated by the fluid passing therethrough to a conduit 29 which communicates between motor 23 and sump 19. The motor 23 is mechanically connected through a gearing arrangement generally indicated at 31 (FIG. 2) to one of wheels 14 such that the speed of motor 23 is restricted to a speed which is proportional to the speed at which wheels 14 are traveling. The pump 18 furnishes sufficient hydraulic fluid in conduit 22 to drive the motor 23 near its maximum operating speed due to its mechanical connection with the wheel 14. Under these conditions (no wheel slipping) fluid will circulate through conduit 22, motor 23, and return conduit 29 without pressure in excess of normal operating pressure being built up in conduit 22. If the wheel 12 begins to slip, however, the output from pump 18 will increase while the rate of fluid flow through motor 23 will remain constant. This will give rise to an increasing pressure in conduit 22 and therefore in conduit 24 as well.

Servo 26 is disposed between the vehicle operator's manually actuated linkage 32 and overriding linkage 30. During normal operation of the vehicle (no wheel slippage) the pressure in conduit 24 will not be sufficient to actuate the servo 26 and the operator's linkage 32 will determine the speed of the vehicle engine. When wheel slippage occurs, however, and the pressure in conduit 24 increases a spring biased piston 33 will be urged against a biasing spring 34 so as to retract and thereby operate linkage 30 which is connected to piston 33 by piston rod 36. The clockwise rotation of linkage 30 due to retraction of piston 33 overrides the vehicle operator's control and causes the vehicle engine to reduce its speed. The speed of the vehicle will continue to be reduced until the power delivered to wheel 12 is insufficient to cause it to slip and the ground speed of wheel 12 once again becomes equal to that of wheels 14. The amount of wheel slippage which it is desired to tolerate can be easily controlled by adjustment of the spring constant of spring 34.

It is seen from the foregoing discussion that in order for the hydraulic control system to accurately determine when the speed of the engine should be decreased it is necessary that a ground speed reference be established somewhere in the system. Particular reference to FIG. 2 will show how the motor 23 provides this function. Motor 23 is secured within an axle 14a which carries one of wheels 14. The bracket 37 which connects motor 23 to axle 14a has formed on one end thereof a ring gear 38. A pair of planet gears 39 are carried by wheel 14 through their shafts 41 and mesh with ring gear 38. Planets 39 also engage a sun gear 42 which is connected through a one-way clutch mechanism 43 to the shaft 44 of motor 23. Thus, the rotation of wheel 14 causes planet 39 to revolve around ring gear 38 which acts as a reaction member and enables the planets to drive sun gear 42. The speed of sun gear 42 is thus proportional to the speed of wheel 14 which represents the ground speed of the tractor-scraper vehicle. Since the fluid which passes through line 22 from pump 18 will want to drive shaft 44 at a speed greater than that at which the shaft is driven by sun 42, the sun 42 and shaft will be connected through one-way clutch 43 (which is designed to provide connection when the speed of sun 42 is less than that at which shaft 44 wants to be driven, and disconnects sun 42 from shaft 44 when the wheel 14 drives the shaft 44 faster than the hydraulic fluid delivered thereto does). As seen from the foregoing description the motor 23 provides a device in the hydraulic system which represents ground speed and which is not a function of the speed of the engine of vehicle 11 or the output of pump 18. Pump 23 has not been shown in detail because pumps which are capable of providing the function described are well known in the art and of various designs, none of which are meant to be limiting on the present invention.

Referring to FIGS. 1 and 2, manually operable valve 28 communicates with sump 19 through a conduit 48 such that a fluid bypass is formed directly between sump 19 and pump 18 via conduits 21, 27 and 48 when the slip control mechanism is not to be employed. Thus, when the vehicle is to be moved from one working location to another working location at relatively high speed, valve 28 is positioned to divert the major portion of the fluid pumped by pump 18 and thus prevent the various components of the system from being operated beyond their normal limits. If the vehicle should be moved at relatively high speeds without valve 28 being placed in the non-operative position, the one-way clutch 43 will automatically overrun the motor shaft 44 at a given speed (determined by the motor characteristics, pump characteristics, etc.) and thereby effectively disconnect the shaft 44 from the sun gear 42.

Referring to FIG. 3, a two wheel tractor 51 having a pair of engine driven wheels 52 is connected to a scraper 53 having a pair of engine driven wheels 54. Because of the difficulty which the operator of such a vehicle has in seeing the rear wheels 54, it is highly desirable to provide means by which slippage of wheels 54 is detected and controlled to prevent excessive wear of the tires. To accomplish this purpose a fluid pump 56 is mechanically associated with the engine which drives wheel 54 so as to be driven at a speed which is proportional to the traveling speed of wheels 54, while a pump 57 is associated with the engine of tractor 51 and operates at a speed which is proportional to the speed of wheels 52. A conduit 58 connects the output of pump 56 to a manually operable valve 59 which leads to the input of pump 57 through a conduit 61 when the valve is in one position (the position shown by solid lines) and to a return line 61 via a conduit 63 when the valve 59 is in the bypass position (shown in dotted lines). Line 58 communicates with a conduit 64 which leads to a servo 66 which controls linkage 67 which controls the speed of operation of the engine which drives wheels 54. When valve 59 is in the operative position (that shown in solid lines) and wheels 54 are traveling at ground speed (as opposed to slipping) pump 56 will deliver approximately the same amount of fluid which pump 57 will pump through a conduit 68 to return line 62 which leads to sump 69 from which pump 56 draws its working fluid. Under these conditions pressure in conduit 58 and thus conduit 64 will remain relatively constant and below the pressure necessary to actuate servo 66 to operate linkage 67. If wheels 54 begin to slip, however, pump 56 will be driven at a greater speed than pump 57 and thus provide more fluid to pump 57 than pump 57 discharges through conduit 68. This will cause a build up of pressure in conduits 58 and 64 and result in servo 66 operating linkage 67 which will in turn reduce the speed of operation of the engine driving wheels 54 until the speed of the wheels is returned to the ground speed. When valve 59 is positioned to bypass fluid through conduit 63 it is seen that a parallel path still exists through conduit 61 such that operation of the slip control can still be maintained even during high speed operation when traveling from one working site to another.

FIG. 4 illustrates an alternate embodiment of a hydraulic slip control for a scraper 71 which has a pair of wheels 72 which are driven by an engine 73. The scraper is drawn by a two wheel tractor 74 which has a pair of wheels 76 which are driven by an engine 77. Once again the control is provided for the purpose of detecting and limiting slip of the scraper wheels 72 which are in a position remote from the vehicle operator and therefore difficult for him to view. Engine 77 drives a hydraulic pump 78 at a speed proportional to the speed of wheels 76 while engine 73 drives a pump 79 at a speed proportional to the speed of wheels 72. The output of pump 78 is delivered via a conduit 81 to one end of a valve 82 which communicates via a conduit 83 with a sump 84 from which pump 78 draws its working fluid. The conduit 83 has a restrictive orifice 86 therein to regulate the return flow to the sump 84. The opposite end of valve 82 communicates with the output of pump 79 via a conduit 87 while a return conduit 88 with a restrictive orifice 89 therein returns the flow from conduit 87 to a sump 91 from which pump 79 draws its working fluid. Valve 82 includes a slidable spool 92 which has a land 93 facing the end of valve 82 which receives the output from pump 78 and a larger land 94 which faces the end of valve 82 which receives the output from pump 79. When wheels 72 and wheels 76 are both traveling at ground speed the output from pumps 78 and 79 will be equal such that the pressure on either end of spool 92 will also be equal and the valve spool 92 will be centrally disposed within the valve housing 96. Passing through the center of valve 82 is a conduit 97 which communicates at one end with servo 98 which controls linkage 99 connected to the engine speed control mechanism of engine 73, and at its other end to a sump (not shown) in the engine 73. A conduit 101 from engine 73 provides hydraulic fluid to conduit 97 at a location between servo 98 and valve 82. When the wheels 76 and 72 are traveling at the same speeds and valve spool 92 thereby centered within valve housing 96, the fluid pumped through conduit 101 will return freely to the sump from which it is drawn through conduit 97 without exerting pressure on servo 98. If, however, wheels 72 slip and thereby drive pump 79 at a speed greater than that of pump 78, pressure will build up behind land 94 shifting spool 92 to the left so as to restrict or block the passage of fluid through conduit 97 and thereby enable pressure to build up in conduit 97 so as to operate servo 98 to reduce the speed of engine 73. A bypass conduit 102 is provided between conduit 101 and conduit 97 to enable the slip control mechanism to be removed from the vehicle when its operation is undesirable. An electrically operated valve 103 opens and closes communication between conduits 101 and 102 from a position within the operator's compartment so that the disposition of the control mechanism can be easily selected by the vehicle operator. If pump 78 should operate at a greater speed than pump 79, spool 92 would shift to the right, but because of the small size of land 93, conduit 97 would not be restricted or blocked.

Referring to FIG. 5, a four wheel tractor 111 includes an engine 112 which drives a pair of rear wheels 113 through a drive shaft 114. Drive shaft 114 operatively connects with engine 112 through a transmission generally shown at 116 which operates at a speed proportional to the speed of wheels 113. A pump 117 is driven by transmission 116 and at a speed proportional thereto. The output from pump 117 is delivered through conduit 118 to a conduit 119 leading to servo 121 which operates linkage 122 associated with the vehicle engine speed control mechanism. A conduit 123 also connects with conduit 118 and leads to a fluid motor 124 which returns the fluid delivered thereto via conduit 127 to the sump 126 from which pump 117 draws its working fluid. The speed of motor 124 is restricted to the speed of the front wheels 128 of the tractor 111 so as to furnish a ground reference speed for the hydraulic control system. Motor 124 is restricted in its operating speed for the reasons explained with reference to the embodiment of FIGS. 1 and 2. The embodiment of FIG. 5 operates through a flexible drive shaft 129 which is driven by the wheels 128 through a connection therewith generally indicated at 131. Shaft 129 connects to motor 124 so as to limit its speed to be proportional to the ground speed of wheels 128. When wheels 113 begin to slip the pump 117 delivers more fluid than is passed by motor 124 under non-slip operating conditions resulting in fluid pressure build up in conduit 119 causing servo 121 to rotate linkage 122 and decrease the speed of the engine 112.

In the various embodiments described above it is noted that both fluid pumps and fluid motors have been employed as means for establishing pressures which are proportional to the ground speed of the vehicle. For this reason the invention is not limited to either hydraulic motors of hydraulic pumps exclusively but rather employs the device having the most advantageous operating characteristics under the particular operating conditions.

We claim:

1. In a power driven vehicle having at least two sets of wheels at least one of which is driven by an engine, the combination comprising:
   a hydraulic fluid pump mechanically associated with the engine and driven at a speed proportional thereto;
   hydraulic means disposed to receive the output of said pump and operable to limit the flow of fluid through said means to a rate proportional to the ground speed of the vehicle, even when the wheels driven by the engine slip;
   means operable to regulate the operating speed of the engine; and
   means communicating with the output of said pump and said engine speed regulating means and responsive to a rise in pressure at the output of said pump due to slippage of the power driven wheels to reduce the operating speed of the engine.

2. In a power driven vehicle having at least two sets of wheels at least one of which is power driven by an engine the combination comprising:
   a hydraulic fluid pump mechanically associated with the one set of wheels to operate at a speed proportional to the speed thereof;
   a hydraulic means disposed to receive the output of said pump and allow the fluid to pass therethrough, said means associated with the other set of wheels and controlled thereby to limit fluid flow through said means to a rate proportional to the speed of those wheels;
   means operable to regulate the speed of the engine; and
   means communicating with the output of said pump and said engine speed regulating means, said means responsive to a rise in pressure at the output of said pump due to slippage of said power driven wheels, to cause said regulating means to reduce the operating speed of the engine.

3. The system of claim 2 further including valve means disposed between said pump and hydraulic means and selectively operable to cause the output of said pump to be bypassed around said hydraulic means when operation of the system is not desired.

4. In a hydraulic clip control system for a tractor drawn scraper wherein the tractor has a pair of power driven wheels and the scraper has a pair of non-power driven wheels the combination comprising:
   a hydraulic pump mechanically associated with the tractor to operate at a speed proportional to the speed of the power driven wheels thereof;
   a fluid motor mechanically associated with one of the non-power driven wheels of the scraper so as to be restricted to an operating speed proportional to the speed of the scraper wheels;
   means communicating the output of said pump with said fluid motor whereby said motor is driven by the fluid from said pump;
   means operable to regulate the speed at which the tractor wheels are driven, said means communicating with the output of said pump and responsive to a rise in pressure at the output of said pump due to slippage of the tractor wheels to reduce the speed at which the wheels are driven.

5. The control system of claim 4 further including:
   valve means disposed between said pump and said motor and selectively operable to divert fluid from said pump away from said motor when operation of said control is not desired.

6. The control system of claim 4 wherein the mechanical association between said motor and the scraper wheel includes a one-way clutch means which operates to connect said motor to the wheel when the fluid from said pump is capable of driving said motor faster than the speed of the scraper wheels will allow it to operate and disconnect the motor from the wheel when the wheel speed is such as to overrun said motor.

7. In a hydraulic slip control for a tractor drawn scraper wherein the tractor has a pair of power driven wheels and the scraper has a pair of power driven wheels the combination comprising:
   a first hydraulic pump mechanically associated with the tractor and driven at a speed proportional to the speed at which the wheels of the tractor are driven;
   a second hydraulic pump mechanically associated with the scraper and driven at a speed proportional to the speed of the scraper wheels;
   means communicating the output of said second pump with the input of said first pump whereby the pressure at the output of said second pump is relatively constant when the tractor drawn scraper is moving and neither set of wheels is slipping;
   means associated with the scraper and operable to regulate the speed at which the scraper wheels are driven; and
   means associated with said second pump and said wheel speed regulating means and responsive to a rise in pressure at the output of the second pump due to the scraper wheels slipping to cause said regulating means to reduce the speed at which the scraper wheels are driven.

8. In a hydraulic slip control for a four wheel engine driven tractor having a set of driven wheels and a set of non-driven wheels the combination comprising:
- a hydraulic fluid pump mechanically associated with, and driven by the engine so as to be driven at a speed proportional to the speed at which the driven wheels are driven;
- a fluid operated motor communicating with, and driven by the output of said pump;
- means mechanically connecting said motor to the non-driven wheels to limit the motor speed to a speed proportional to the speed of the non-driven wheels and thereby establish a ground speed reference;
- regulating means associated with the engine and operable to regulate the speed thereof;
- servo means communicating with said regulating means and said pump and responsive to the pressure at the output of said pump rising above that which exists when the driven wheels are driven at ground speed to induce said regulating means to decrease the speed of the engine.

References Cited by the Examiner

UNITED STATES PATENTS

| | | | |
|---|---|---|---|
| 2,170,766 | 8/1939 | Rieger | 105—48 |
| 3,014,764 | 12/1961 | Heckendorf | 303—21 |
| 3,061,030 | 10/1962 | Shallenberg | 180—77 X |

A. HARRY LEVY, *Primary Examiner.*